US012173879B2

(12) United States Patent
Miyazawa

(10) Patent No.: US 12,173,879 B2
(45) Date of Patent: Dec. 24, 2024

(54) CANE

(71) Applicant: TOYOTA JIDOSHA KABUSHIKI KAISHA, Toyota (JP)

(72) Inventor: Tsuyoshi Miyazawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/543,821

(22) Filed: Dec. 18, 2023

(65) Prior Publication Data

US 2024/0210023 A1 Jun. 27, 2024

(30) Foreign Application Priority Data

Dec. 27, 2022 (JP) ................................. 2022-210629

(51) Int. Cl.
*F21V 23/04* (2006.01)
*A61H 3/06* (2006.01)
*G08B 5/38* (2006.01)

(52) U.S. Cl.
CPC ......... *F21V 23/0492* (2013.01); *A61H 3/061* (2013.01); *A61H 3/068* (2013.01); *A61H 2201/0188* (2013.01); *G08B 5/38* (2013.01)

(58) Field of Classification Search
CPC .......... G08B 5/38; A61H 3/068; A61H 3/061; A61H 2201/0188; F21V 23/0492
See application file for complete search history.

(56) References Cited

U.S. PATENT DOCUMENTS 11,185,461 B2 * 11/2021 Crosby .................... A61H 1/00
2017/0224573 A1 * 8/2017 Challa ...................... A45B 9/04

FOREIGN PATENT DOCUMENTS

JP 2007-160053 A 6/2007

OTHER PUBLICATIONS

Innovation Q+ (Year: 2024).*

* cited by examiner

*Primary Examiner* — Anabel Ton
(74) *Attorney, Agent, or Firm* — Dinsmore & Shohl LLP

(57) ABSTRACT

A cane includes a cane body, a controller, and a light source. The controller changes the blinking frequency F of the light source to blink the light source according to the usage situation of the cane by the user. The usage situation is the swing speed SP of the cane. The controller blinks the light source with a higher blinking frequency F the faster the swing speed SP of the cane. The acceleration of the cane is measured by the acceleration sensor, and the swing speed is calculated by a computing unit based on the measured acceleration.

3 Claims, 6 Drawing Sheets

CANE

CROSS REFERENCE TO RELATED APPLICATION

This application claims priority to Japanese Patent Application No. 2022-210629 filed on Dec. 27, 2022, which is incorporated herein by reference in its entirety including the specification, claims, drawings, and abstract.

TECHNICAL FIELD

The present disclosure relates to a cane having a light source. The present disclosure relates particularly to technology for controlling that light source.

BACKGROUND

A cane with a light source is known.

Patent document 1 describes a cane having a piezoelectric element and a light emitting element. When an impact occurs on said cane, the light emitting element emits light due to the piezoelectric effect.

Simply turning on a light source on a cane makes it difficult to distinguish the light source on the cane from light sources on objects other than the cane (e.g., bicycle lights or pedestrian flashlights), especially at night. For example, when a visually impaired person uses a cane with a light source, it is difficult for surrounding people to recognize that the visually impaired person is using the cane from the light emitted by the light source alone.

The purpose of the present disclosure is to ensure that a cane is easily recognized by surrounding people that it is being used by a person.

CITATION LIST

PATENT DOCUMENT 1: JP 2007-160053 A

SUMMARY

One aspect of the present disclosure is a cane having a cane body, a light source installed in the cane body, and a controller that causes the light source to blink while changing a blinking frequency of the light source according to a use status of the cane body by a user.

According to this disclosure, it is easily recognized by surrounding people that a cane is being used by a person.

BRIEF DESCRIPTION OF DRAWINGS

Embodiment(s) of the present disclosure will be described based on the following figures, wherein.

DESCRIPTION OF EMBODIMENT

Figure 1:
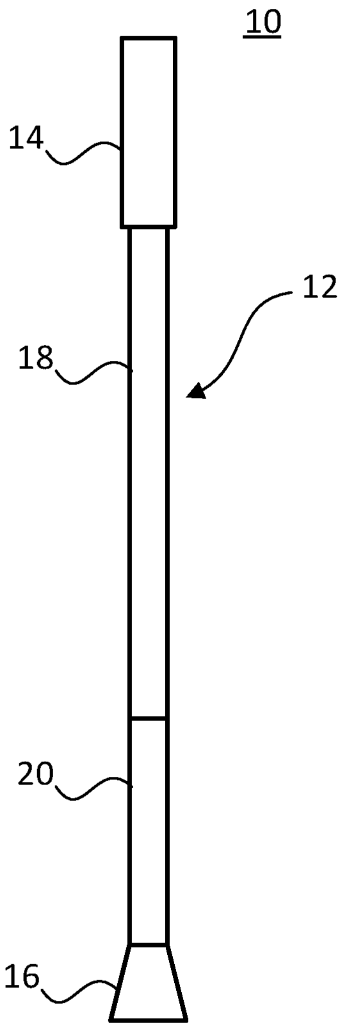
FIG. 1 shows an appearance of a cane.
Figure 2:
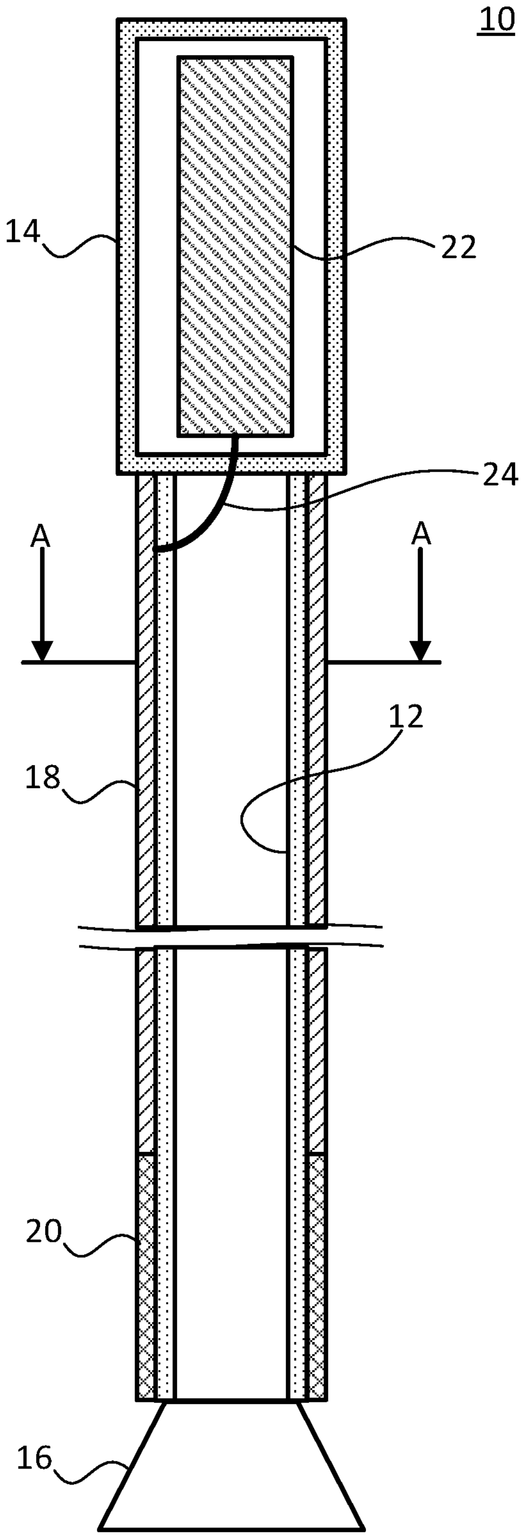
FIG. 2 is a schematic cross-sectional view of an embodiment of a cane.

With reference to FIGS. 1 and 2, a cane of the embodiment is described. FIG. 1 shows the appearance of a cane 10 of the embodiment. FIG. 2 is a schematic cross-sectional view of the cane 10.

The cane 10 includes a cane body 12, a grip portion 14, and a tip portion 16. The cane body 12 is a tubular (e.g., cylindrical) elongated member. The grip portion 14 is attached to one end of the cane body 12. The grip portion 14 is a member that is grasped by the user when the cane 10 is used. The tip 16 is attached to the other end of the cane body 12. The tip 16 is a member that contacts the ground, floor, or other surface when the cane 10 is used. For example, the tip 16 is made of a rubber or other resin.

The cane 10 also includes a light source 18 and a light source 20. The light source 18 and light source 20 are light emitting devices, such as an EL (Electro Luminescence) sheet. As shown in FIG. 2, the light source 18 and light source 20 are wrapped around the surface of the cane body 12 so as to cover the surface of the cane body 12.

The light source 20 is wrapped around the tip 16 side of cane body 12. The light source 18 is wrapped around the surface of the cane body 12 from the grip portion 14 to the light source 20. The light sources 18 and 20 emit light of different colors. For example, light source 18 emits white light and light source 20 emits red light. The area occupied by the light source 18 on the surface of the cane body 12 is larger than the area occupied by the light source 20.

A controller 22 is located inside the grip portion 14. The controller 22 is connected to the light sources 18, 20 by a cable 24. The controller 22 controls the emission of the light sources 18, 20, respectively.

The controller 22 need not be located inside the grip portion 14. The controller 22 may be attached to an outer surface of the grip portion 14. For example, a ring-shaped member may be attached to an outer surface of the grip portion 14. The controller 22 may be provided inside of that ring-shaped member.

A power supply is located inside the cane body 12, grip portion 14, or tip 16. The power supply provides power to the light source 18 and the light source 20. A switch for the power source is provided in the cane body 12 or grip portion 14. For example, when the user turns on said switch, controller 22 turns on light source 18 and light source 20. This causes the light source 18 to emit white light and the light source 20 to emit red light. While the switch is on, controller 22 may continue to turn on light source 18 and light source 20 (always on) or may blink light source 18 and light source 20 according to a predetermined cycle.

For example, the cane 10 is used by a visually impaired person. The light source 18 occupies a large area on the surface of the cane body 12, and the light source 18 emits white light. Thus, most of the cane body 12 emits white light. The tip of the cane 12 emits red light. Therefore, it is easy for the surrounding people to visually recognize that the cane 10 is a white cane used by a visually impaired person. For example, even at dusk or at night, people in the vicinity can easily recognize the presence of a visually impaired person using a white cane.

Generally, a visually impaired person uses a white cane with the tip of the white cane in contact with the ground or floor while swinging the white cane in the left and right directions. When the cane 10 is used in this manner, if the light sources 18 and 20 are always lit, it may be difficult for people in the vicinity to recognize the shape of the cane 10 due to the afterimage effect caused by the swinging motion of the cane 10.

To address the above difficulties, in this embodiment, the controller 22 blinks the light sources 18, 20. A flashing frequency F is set according to the use of the cane 10. The controller 22 blinks the light sources 18, 20 according to that blinking frequency F. The usage situation is the speed at which the cane 10 is swung, or the extent to which the cane 10 is swung.

Figure 3:
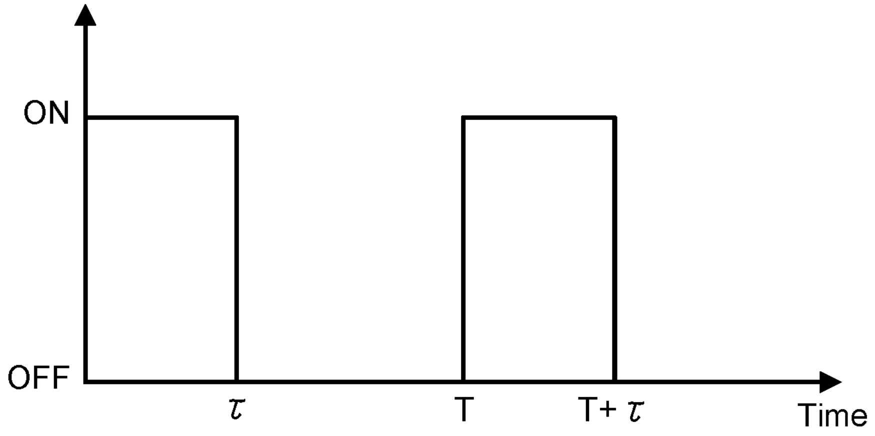
FIG. 3 shows periods when a light source is on and when the light source is off.

The duty ratio D may be set according to the use of the cane 10. The duty ratio D is the ratio ($\tau$/T) of the length of the period $\tau$ during which the light sources 18, 20 are on to the length of the period T during which the light sources 18, 20 are off. The controller 22 blinks the light sources 18, 20 according to its duty ratio D. FIG. 3 shows the periods $\tau$, T. The horizontal axis shows time, and the vertical axis shows the light sources 18, 20 on or off. The controller 22 turns on the light sources 18, 20 during the period $\tau$. The controller 22 turns off the light sources 18, 20 during the period T after the period $\tau$. Thereafter, the controller 22 repeats flashing the light sources 18, 20 according to the duty ratio D.

Figure 4:
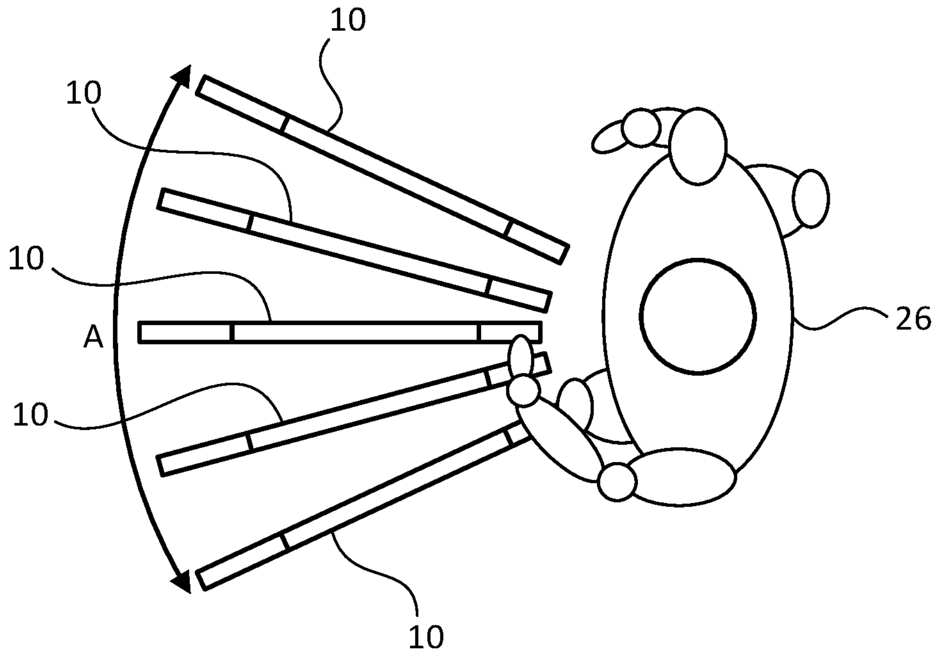
FIG. 4 shows a view of the user and the cane from above the user's head.

FIG. 4 shows the range of swinging the cane 10. FIG. 4 is a view of user 26 and cane 10 from above user 26's head. For example, user 26 swings the cane 10 in a left-right direction in front of user 26.

Generally, when a visually impaired person uses a white cane, a swing A of the cane 10 is about 800 mm, and the speed of reciprocation in the left-right direction is 1.2 seconds/reciprocation. In this case, the blinking frequency F is set to 5 to 8 Hz and the duty ratio D is set to 0.1 to 0.3. By blinking the light sources 18 and 20 under these conditions, the effect of the afterimage effect is suppressed. This makes it easier for the surrounding people to recognize the cane 10 as a white cane. Of course, these values can vary depending on the body shape of the person using the cane 10 and the method of use.

Figure 5:
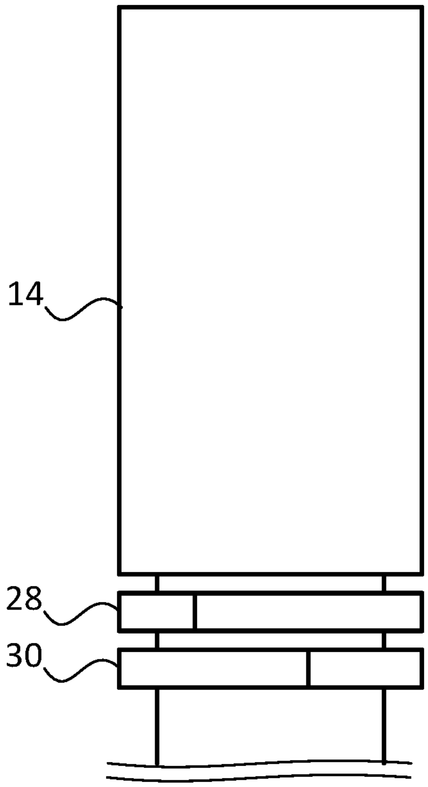
FIG. 5 shows a switch for adjusting the blinking frequency and duty ratio of the light source.

The blinking frequency F and duty ratio D may be changed by the user. For example. As shown in FIG. 5, ring-shaped switches 28, 30 are provided at a location below the grip portion 14. The switches 28, 30 are rotatable switches that can be rotated about the cane body 12.

The switch 28 is a switch for adjusting the flashing frequency F. By rotating the switch 28, the flashing frequency F can be changed. The controller 22 causes the light sources 18, 20 to blink according to the blinking frequency F adjusted by the operation on the switch 28.

The switch 30 is a switch for adjusting the duty ratio D. By rotating the switch 30, the duty ratio D can be changed. The controller 22 flashes the light sources 18, 20 according to the duty ratio D adjusted by the operation on the switch 30.

Figure 6:
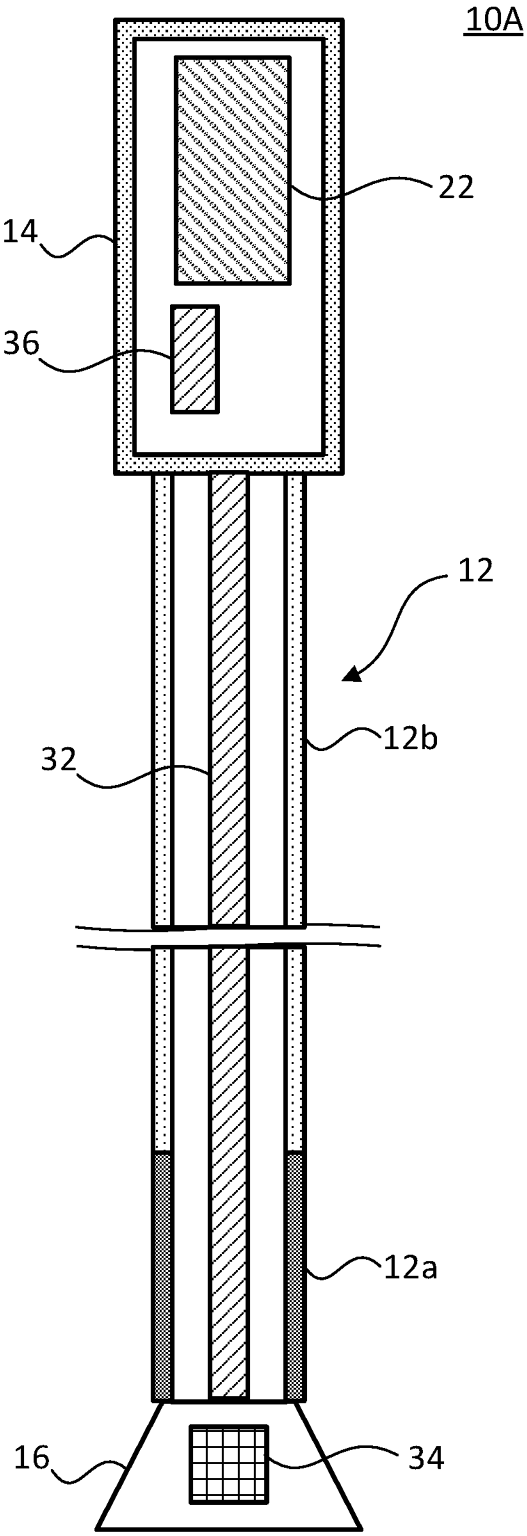
FIG. 6 is a schematic cross-sectional view of a cane, showing the configuration for changing the blinking frequency according to the use of the cane.

The controller 22 changes the flashing frequency F according to the use of the cane, but FIG. 2 does not show the detailed configuration for this purpose. In the following, the configuration for changing the flashing frequency F according to the usage of the cane will be explained again with reference to FIG. 6. FIG. 6 shows a schematic cross-sectional view of a cane 10A in a slightly modified embodiment.

The cane 10A, like the cane 10, includes the cane body 12, the grip portion 14, and the tip 16. The controller 22 is provided inside the grip portion 14.

The cane 10A includes a light source 32 instead of the light sources 18 and 20. The light source 32 is a rod-shaped light emitter. For example, the light source 32 is a light emitting device such as an LED (Light Emitting Diode). The light source 32 is provided inside the cane body 12 from the grip portion 14 to the tip portion 16. The controller 22 and the light source 32 are connected by a cable.

The cane body 12 is a pipe made of translucent resin (e.g., reinforced resin). The surface of the tip 12*a* (the portion on the side of the tip 16) of the cane body 12 is colored red. The surface of the portion 12*b* between the grip portion 14 and the tip 12*a* is colored white. The area occupied by the portion 12*b* is larger than that occupied by the tip 12*a*. Thus, a person in the surrounding area will perceive the color of most of the cane body 12 as white and the color of the tip as red.

In daylight, the white and red colors are distinguished and recognized by surrounding people by the reflection of outside light on the surface of the cane body 12. At night, the controller 22 turns on light source 32. The light from the light source 32 penetrates the surface of the cane body 12, causing the tip 12A to emit red light and the portion 12B to emit white light. This makes it easy for the surrounding people to visually recognize that the cane 10A is a white cane used by a visually impaired person. To reduce unevenness of light, a member having a polarization diffusion function may be used as a member of the cane body 12.

The cane 10A also includes an acceleration sensor 34 and a computing unit 36. The acceleration sensor 34 is provided inside the tip 16. The computing unit 36 is provided inside the grip portion 14. The acceleration sensor 34 and the computing unit 36 are connected by a cable. The computing unit 36 may be incorporated in the controller 22.

The acceleration sensor 34 measures the acceleration of the tip 16 of the cane 10A. For example, when the user swings the cane 10A, the acceleration is measured by the acceleration sensor 34. The value measured by the acceleration sensor 34 is output to the computing unit 36. The computing unit 36 calculates the swing speed SP of the cane 10A based on the acceleration measured by the acceleration sensor 34.

The controller 22 controls the flashing of the light source 32 by changing the flashing frequency F according to the swing speed SP calculated by the computing unit 36.

For example, the relationship between the swing speed SP and the flashing frequency F is set in advance so that the faster the swing speed SP is, the higher the flashing frequency F is. The information indicating the setting is stored in the memory provided in the controller 22. The controller 22 blinks the light source 32 at the blinking frequency F according to the swing speed SP of the cane 10A in accordance with the setting.

The faster the swing speed SP is, the higher the blinking frequency F is, thereby suppressing the influence of the afterimage effect. As a result, the cane 10A is more easily recognized by surrounding people as a cane. If the blinking frequency F is low when the swing speed SP is fast, the light from the light source 32 is easily perceived by people as an afterimage. Therefore, it becomes difficult for people in the surrounding area to recognize the shape of the cane 10A. By making the blinking frequency F higher as the swing speed SP is faster, the light from the light source 32 is less likely to be perceived by people as an afterimage. Therefore, people in the surrounding area will have an easier time recognizing the shape of the cane 10A.

Figure 7:
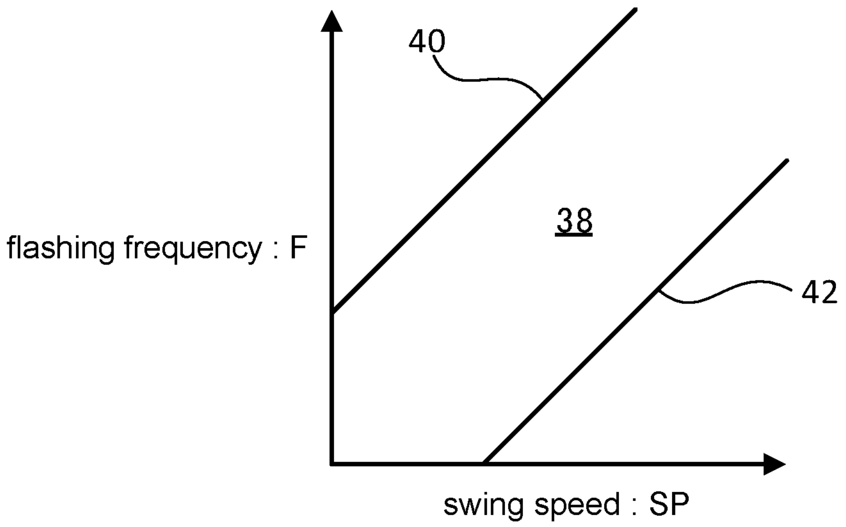
FIG. 7 is a map showing the relationship between cane swing speed and flashing frequency.

A map showing the relationship between swing speed SP and flashing frequency F may be created in advance. The map is shown in FIG. 7. The horizontal axis shows the swing speed SP. The vertical axis shows the flashing frequency F.

An appropriate range 38 of blinking frequency F is set in advance. The appropriate range 38 is a range of blinking frequency F within which the influence of the afterimage effect can be suppressed. The appropriate range 38 is a range having some width. The appropriate range 38 is set so that the faster the swing speed SP is, the higher the blinking frequency F is. The information indicating the map is stored in advance in the memory of the controller 22. By referring to the map, the controller 22 identifies the flashing frequency F that is included in the appropriate range 38 and that corresponds to the swing speed SP. The controller 22 causes the light source 32 to blink according to the identified blinking frequency F.

The appropriate range 38 has an upper limit 40 and a lower limit 42. The controller 22 may select any of the flashing frequencies F included between the upper limit 40 and the lower limit 42. The controller 22 may flash the light source 32 according to the selected flashing frequency F. The controller 22 may blink the light source 32 according to a blinking frequency F between the upper limit 40 and the lower limit 42.

The controller 22 may change the duty ratio D depending on the use of the cane 10A. For example, the controller 22 decreases the duty ratio D the faster the swing speed SP is. The length of the period $\tau$ during which the light source 32 is turned on is relatively shorter than the length of the period T during which the light source 32 is turned off. Therefore, the light from the light source 32 becomes difficult for people to perceive as an afterimage. As a result, people in the surrounding area can easily recognize the shape of the cane 10A. Similar to the proper range 38 of the blinking frequency F, a proper range of the duty ratio D to the swing speed SP may be set. In this case, the controller 22 controls the flashing of the light source 32 according to the proper range of the duty ratio D.

The controller 22 may change the flashing frequency F and duty ratio D according to the usage of the cane 10A. For example, the controller 22 increases the flashing frequency F and decreases the duty ratio D the faster the swing speed SP is.

Switches 28 and 30 may be provided on the cane 10A. Switch 28 is a switch for adjusting the flashing frequency F. Switch 30 is a switch for adjusting the duty ratio D.

When the user selects the flashing frequency F by the switch 28, the controller 22 may determine whether the flashing frequency F selected by the user is within the appropriate range 38. If the user-selected blinking frequency F is within the appropriate range corresponding to the swing speed SP of the cane 10A, the controller 22 causes the light source 32 to blink according to the blinking frequency F selected by the user. If the flashing frequency F selected by the user is not within the appropriate range corresponding to the swing speed SP of the cane 10A, the controller 22 does not flash the light source 32 according to the flashing frequency F selected by the user, but flashes the light source 32 according to the current flashing frequency F. The same applies when the appropriate range of duty ratio D is set.

Like the cane 10A, the cane 10 may also include acceleration sensor 34 and computing unit 36. In this case, as in the cane 10A, the controller 22 blinks light sources 18, 20 according to a blinking frequency F corresponding to swing speed SP. The controller 22 also blinks the light sources 18, 20 according to a duty ratio D corresponding to the swing speed SP.

Each of the controller 22 and the computing unit 36 described above is, for example, a CPU (Central Processing Unit), GPU (Graphics Processing Unit), ASIC (Application Specific Integrated Circuit), FPGA (Field Programmable Gate Array), DSP (Digital Signal Processor), other programmable logic devices, or electronic circuits.

The respective functions of the controller 22 and the computing unit 36 are realized by the cooperation of hardware and software resources. For example, each function is realized when the CPU reads and executes a program stored in a storage device. The program is stored in the storage device via a recording medium such as a CD or DVD, or via a communication path such as a network. As another example, the respective functions of the controller 22 and the computing unit 36 may be realized by hardware resources such as electronic circuits.

REFERENCE SIGNS LIST

10 cane, 12 cane body, 14 grip portion, 16 tip, 18, 20, 32 light source, 22 controller, 28, 30 switch, 34 acceleration sensor, 36 computing unit.

The invention claimed is:

1. A cane comprising:
- a cane body;
- a light source installed in the cane body; and
- a controller that causes the light source to blink while changing a blinking frequency of the light source according to a use status of the cane body by a user,
- wherein the controller changes the blinking frequency of the light source according to a swing speed of the cane body.

2. The cane according to claim 1, wherein
- the controller further changes the blinking frequency by changing a ratio between a length of time the light source is on and a length of time the light source is off, according to the use status of the cane body.

3. A cane comprising:
- a cane body;
- a light source installed in the cane body;
- an acceleration sensor provided in a tip of the cane body, the acceleration sensor measures an acceleration of the tip of the cane body; and
- a central processing unit that calculates a swing speed of the cane based on the acceleration measured by the acceleration sensor, the central processing unit controls a blinking frequency of the light source based on the calculated swing speed such that the blinking frequency is higher when the calculated swing speed is faster compared to the blinking speed when the calculated swing speed is slower.

* * * * *